Sept. 28, 1965    C. WOOD ETAL    3,208,276
DISPLACEMENT MEASURING DEVICE
Filed Aug. 4, 1961

CHARLES WOOD
OSCAR TISCHLER
INVENTORS

BY S. A. Giarratana
George B. Oujerolk
ATTORNEYS

United States Patent Office 3,208,276
Patented Sept. 28, 1965

3,208,276
DISPLACEMENT MEASURING DEVICE
Charles Wood, Ridgewood, and Oscar Tischler, West Caldwell, N.J., assignors to General Precision Inc., Little Falls, N.J., a corporation of Delaware
Filed Aug. 4, 1961, Ser. No. 129,293
1 Claim. (Cl. 73—170)

The present invention relates to a displacement measuring device, and more particularly to a displacement measuring device adapted to measure small displacements caused by stress or strain. The invention also relates to the use of a Hall-effect device for the foregoing purpose.

The Hall-effect is the development of a transverse electric potential gradient in a current-carrying conductor upon the application of a magnetic field (The International Dictionary of Physics and Electronics, D. Van Nostrand Company, Inc., New York, 1956). The Hall voltage produced by the Hall-effect is $$V_H = K I_x B_y$$

where
$V_H$ is the Hall output voltage,
$B_y$ is the magnetic field in the $y$ direction
$I_x$ is the excitation current in the $x$ direction
$K$ is a constant for a particular Hall crystal The foregoing formula is usually written as $V_H = KIB$.

The general formulas relating to the Hall effect have been known for some seventy-five years. However, until recently, no appreciable voltage could be obtained from Hall-effect devices. At present, several semiconductor crystals are commercially available which will produce a useable Hall voltage. These crystals are usually referred to as Hall crystals, and are used by placing the crystal between the two poles of a permanent or electromagnet.

With regards to the magnetic field itself, this is usually a field created by two flat pole piece faces of a magnet or magnets, the Hall crystal being disposed between the two faces. The classical Stern-Gerlach experiment conducted in Germany in 1924 suggests that the field configuration may be varied so as to provide areas or points of maximum magnetic flux concentration. The Stern-Gerlach experiments have also remained largely a matter of theoretical science and the results thereof are not normally usen in connection with Hall-effect devices, and neither the Hall-effect devices nor the Stern-Gerlach effect appear to have found widespread use in scientific instruments. Many scientific devices used for measuring depend on some physical displacement. Examples of such instruments are wind velocity indicators, rain gages, balances, manometers, etc. Wind velocity indicators usually comprise a vertical shaft having a plurality of radial rods extending from the top thereof. Cups are mounted on the ends of the rods. As the wind blows, it rotates the cups which in turn rotate the shaft giving the wind velocity by the speed of the shaft rotation. Such devices must be installed in remote areas such as deserts, high mountains, cold regions, hot regions, etc. The cups often are blown off by the wind, the radial rods break, and other difficulties are encountered with wind velocity indicators having moving parts. Similar difficulties are encountered with other scientific instruments. Attempts have been made to measure displacement by a variety of means. The light beam method has found a number of applications but cannot be used for universal application. Although many attempts have been made to provide a good displacement measuring device useful in connection with scientific instruments, none, as far as I am aware have ever been completely successful when carried out into actual practice on an extensive scale.

It has now been discovered that Hall-effect displacement measuring devices can be provided which can be used as solid state devices eliminating many defects of devices having moving parts. Although probably not universal in their application, the devices contemplated herein can be used in place of existing wind velocity meters to great advantage.

Thus, an object of the present invention is to provide a displacement measuring device useful in connection with scientific instruments.

Another object of the present invention is to provide such a device which has a minimum of moving parts.

Still another object of the present invention is to provide a device capable of measuring very small displacements.

Yet another object of the present invention is to provide a device useful in connection with meterological instruments.

The invention as well as its many objects and advantages will become more apparent from the following description taken in conjunction with the accompanying drawings in which:

FIG. 1b is a top view of the device shown in FIG. 1a;

FIG. 2 is a perspective view of another embodiment of the device shown in FIG. 1a.

Figure 1B:
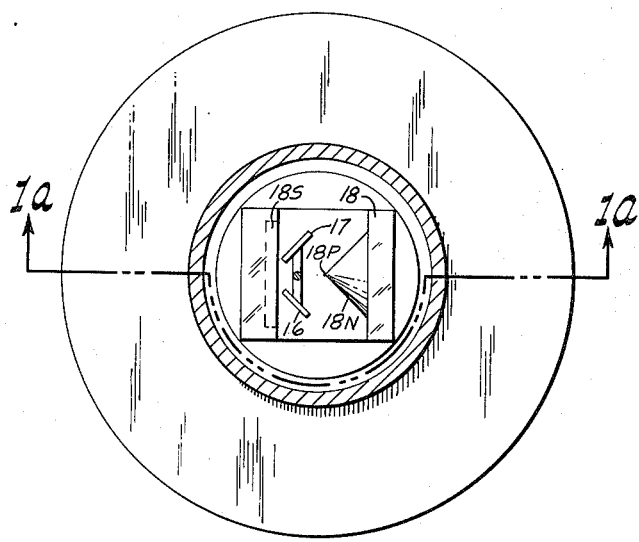
Figure 1A:
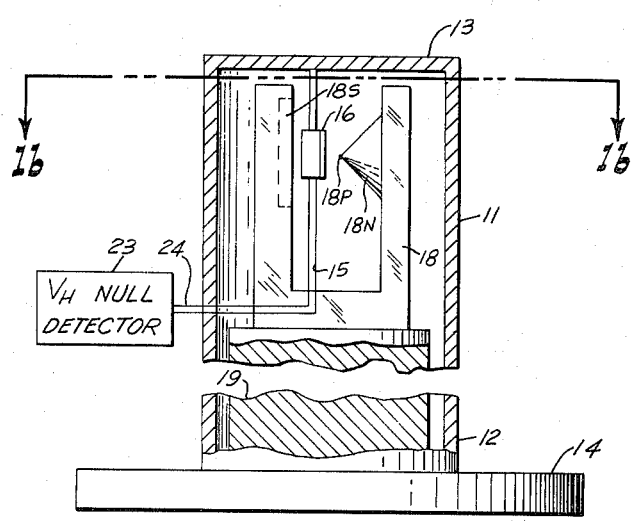
FIG. 1a is a cross-sectional view of a wind velocity indicator contemplated herein.
Figure 2:
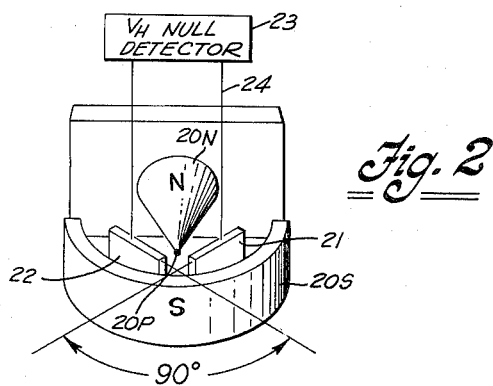

Broadly stated, the present invention utilizes the principles derived from the Stern-Gerlach experiments to provide a magnetic field having therein an area of maximum magnetic intensity, and sharp field gradients outside of this area. To provide such a field, one of the poles should have a triangular type of configuration, the pole terminating at the apex of the triangle, whereas the other pole should have a concave type of configuration, the apex of the first pole facing at about the center of the concave pole. This concept may be applied in practice to a wind velocity indicator 11 shown in the drawing. This device includes a thin walled tube 12 closed at one end 13 and supported in an upright cantilever fashion on a solid base 14 at the other end. This tube 12 is deflected by the force of the wind. The amount of deflection is proportional to the square of the wind velocity. The direction of bending will be that of the wind direction. Rigidly suspended from the top of tube 12 on bar 15 are a pair of rectangular Hall crystals 16 and 17 of matched characteristics, mounted in the vertical plane at a 90° angle to each other. These Hall crystals move in the air gap of a magnet 18, mounted on a rigid support 19. One pole $18_S$ has a concave symmetrical geometric cross-sectional configuration in the form of a hollow cylinder. The other pole $18_N$ is designed to provide a sharp field gradient, and, for the open-ended rectangular configuration of pole $18_S$, the opposite pole should have a conical configuration $18_N$ terminating in a point, $18_P$, the cone walls being at an angle of about 70° to each other, so disposed with respect to the hollow cylinder pole $18_S$ as to be over the center of the hollow portion. The two Hall crystals 16 and 17 are interposed between the two poles $18_N$ and $18_S$, at 90°. It is also possible to have one magnetic pole $20_S$ in the form of an arc of an arc of about 180°, whereas the other pole $20_N$ of magnet 20 is of conical shape having a ball point tip $20_P$. The Hall crystals 21 and 22 are disposed at right angles between the arc center of pole $20_S$ and ball point tip $20_P$. The output of the crystals 16 and 17 or 21 and 22 are fed to a Hall null detector 23 across leads 24. By proper calibration, the null detector may provide wind velocity for known directions instead of voltage away from the null. Although not shown in the drawing needless to say, the Hall crystals also require an excitation current.

The crystals are so disposed that the crystal center is perpendicular to the maximum field of intensity of the magnetic field and magnetically equidistant from the poles. This is readily achieved by placing the Hall output voltage of both crystals across the null detector and feeding both crystals the same excitation current. From the drawing it is evident that any stress or strain on rod 15 will move the crystals in the magnetic field. There will therefore be a change in the Hall voltage output of crystals 16, 17, 21, 22. Wind velocity for known wind directions can then be ascertained.

Thus, using standard formula for wind pressure and for the maximum or free end deflection of a cantilever beam, for a device having a tube 2 feet long; outside diameter, 1"; wall thickness, 0.010", there will be a deflection of 0.000168" of the beam for a 5 miles per hour wind and similarly, there will be a deflection of 0.267" for a 200 miles per hour wind. The deflection of the beam will thus move the Hall crystals in the field. The output across the null detector is a measure of the intensity of the wind.

It is to be observed therefore that the present invention provides for an improvement in an instrument for measuring small displacement, and comprises in combination, a displacement member, a fixed member, first means creating a magnetic field having an area of maximum field intensity and sharp gradients outside this field, second means including a Hall crystal disposed in said area so as to be affected by said intensity, one of said means being mounted on said displacement member, the other of said means being mounted on said fixed member, and, reading means coupled to said Hall crystal means to read any change in output therefrom. Preferably, the Hall crystal is mounted on said displacement member. The required magnetic field having an area of maximum field intensity and sharp gradients outside this field can be created by a magnet having a first pole having a concave configuration, and a second pole having a conical configuration, the apex of the pyramid configuration being centered on and in proximity to said pole of concave configuration, the Hall crystal is interposed between the two poles at a place where it is subject to the maximum magnetic intensity. This may readily be done using a Hall voltage voltmeter. Any movement of the crystal in the field can thus be readily detected by a change in said voltmeter reading. The foregoing concept may be applied to a wind velocity indicator having a thin walled hollow tube supported upright on a solid base, closed at one end and having a rigid bar suspended from said closed end. A pair of rectangular shaped Hall crystals are mounted at right angles to each other in the vertical plane between the poles of a magnet having one concave and one conical shaped pole. In this case, the outputs of both crystals are fed to a null detector. Any deflection of the tube by wind causes the crystals to move in the magnetic field causing a deviation from the null in said null detector.

In describing the foregoing invention, little mention has been made of the excitation current required. The proper current to be applied is well known to those skilled in the art and for this reason the excitation current supply means and leads have been omitted from the drawing.

It will be apparent to those skilled in the art, that our present invention is not limited to the specific details described above and shown in the drawings, and that various modifications are possible in carrying out the features of the invention and the operation and the method of support, mounting and utilization thereof, without departing from the spirit and scope of the appended claim.

We claim:

An instrument for indicating wind velocity in certain directions with respect to the instrument, comprising in combination, a solid base, a thin walled hollow tube supported upright at one end on said base and closed at the other end; a rigid bar suspended from said closed end; a pair of thin flat, rectangular-faced Hall crystals mounted on said bar so that said rectangular faces are in close proximity and define a right angle with respect to each other, each crystal being equi-distant from the apex of said defined right angle; a magnet rigidly affixed to said base having a first pole with a concave face, a second cone-shaped pole, the apex of said second pole being in close proximity and centered on said first pole concave face, said pair of crystals being interposed between said two poles, the conical axis of said second pole bisecting the right angle defined by said faces; and, a null detector coupled to the output of said crystals so that winds in certain directions will deflect said hollow tube causing said crystals to so move in the magnetic field between the magnet poles as to cause said null detector to deviate from the null.

References Cited by the Examiner

UNITED STATES PATENTS 2,987,669   6/61   Kallmann _____ 324—45

RICHARD C. QUEISSER, *Primary Examiner.*